United States Patent [19]

Ishibashi et al.

[11] 3,775,572

[45] Nov. 27, 1973

[54] CONDENSER MICROPHONE

[75] Inventors: Hisanori Ishibashi, Tokyo; Motomu Mimachi, Atsugi; Masahisa Iwata, Hatano, all of Japan

[73] Assignee: Sony Corporation, Tokyo, Japan

[22] Filed: Aug. 29, 1972

[21] Appl. No.: 284,466

[30] Foreign Application Priority Data

Aug. 31, 1971 Japan ................................ 46/78484

[52] U.S. Cl. ................................................ 179/111 R
[51] Int. Cl. ............................................ H04r 19/04
[58] Field of Search .................... 179/111 R, 111 E, 179/106, 110 B, 1 R, 1 A; 29/594

[56] References Cited

UNITED STATES PATENTS 3,436,492 4/1969 Reedyk ........................... 179/111 E
3,445,596 5/1969 Drake et al. .................... 179/111 R

*Primary Examiner*—Kathleen H. Claffy
*Assistant Examiner*—Thomas L. Kundert
*Attorney*—Benjamin H. Sherman et al.

[57] ABSTRACT

A condenser microphone and method of construction is described. The condenser microphone is integrally formed with a number of electrical leads molded into an insulating member of the microphone and with an active electronic element bonded to one of the leads and having an electrode connected to the lead and also capsulated in the insulating member and with electrodes of the active element connected to the other leads so as to provide a compact, rugged and inexpensive condenser microphone.

12 Claims, 12 Drawing Figures

CONDENSER MICROPHONE

BACKGROUND OF THE INVENTION

1. Field of the Invention

This invention relates in general to a method and apparatus for a condenser microphone and in particular to a novel condenser microphone which is compact, rugged and inexpensive.

2. Description of the Prior Art

Condenser microphones have a desirable substantially flat frequency response over a wide band, as for example, between 100 Hz–10 KHz. Condenser microphones have a high output impedance and generally an active element such as a vacuum tube or a field effect transistor is normally mounted in the microphone housing. A condenser microphone comprises a diaphragm mounted in a metallic housing and a backplate assembly which consists of a backplate and a support for the backplate so as to support it a predetermined distance from the diaphragm. A metal cap closes one end of the housing. The metallic housing encloses a printed circuit board on which is mounted an impedance converting means including an active element such as, for example, an FET and resistance elements. The FET has its gate electrode connected by a lead wire to a second electrode plate. Output and power supply leads must also be supplied to the microphone and connected to the FET and the electrode plates. Such construction requires that a condenser microphone be relatively large to accommodate the printed circuit and the hybrid circuits formed thereon. Also, since the field effect transistor may be separated from the second electrode plate by a substantial distance, the lead wire connecting the gate electrode of the field effect transistor with the second electrode plate may pick up undesired noise. Also, such lead might be broken or disconnected which would render the microphone inoperative. It is also difficult to assemble such microphones because there are a number of lead lines which must be connected between various electrical parts thus rendering such microphones expensive and subject to failure due to lead breakage.

SUMMARY OF THE INVENTION

An improved compact condenser microphone which is sturdy and reliable and which has a long life span is an object of the present invention.

Another object of the invention is to provide an active element integrally formed in a backplate assembly opposite the diaphragm such that the active element and leads therefor are incapsulated so as to prevent them from breaking and thus causing failure of the microphone. Such structure also assures that the lead wire from the microphone to the active element is short thus minimizing pick-up noise.

A further object of the invention is to provide a method for constructing a condenser microphone which is small and in which an integrated circuit pellet including an active element is bonded to one of the input leads and the integrated circuit pellet is electrically connected to the other leads and the whole assembly is incapsulated in an insulating resin and wherein the assembly serves to support a backplate as well as to hold the integrated circuit pellet and from an acoustic chamber.

Yet another object of the invention is to provide a method of constructing a condenser microphone in which a number of groups of conductor leads are prepared with each group consisting of at least three leads and wherein an integrated circuit pellet is bonded to one of the three leads of each group and also electrically connected to the other leads of each group and the assembly incapsulated by molding a backplate assembly to the tips of the electrical leads of each group so as to form a backplate assembly for the microphone that can be simply and inexpensively produced in mass production.

Yet another object of the invention is to provide a condenser microphone which has few parts and can be constructed in an inexpensive manner.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

DESCRIPTION OF THE PREFERRED EMBODIMENTS

Figure 1:
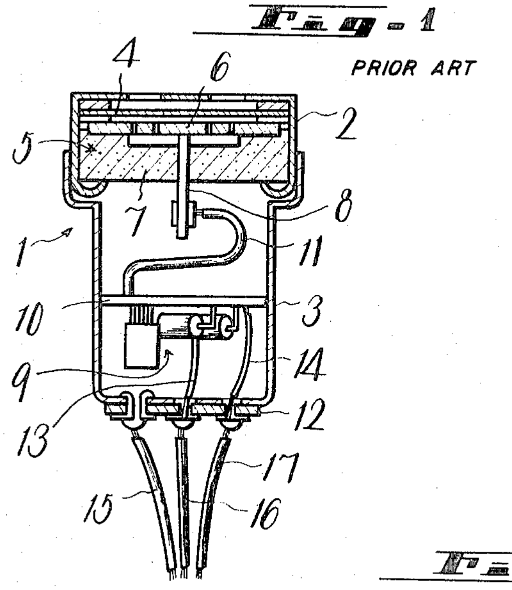
FIG. 1 PRIOR ART
FIG. 1 is a vertical cross sectional view of a conventional condenser microphone of the prior art.

FIG. 1 illustrates a condenser microphone 1 according to the prior art which includes a metallic cylindrical shaped cap 2 which is received in a cylindrical shaped metallic housing 3. A diaphragm 4 is mounted in the metallic cap and is electrically connected to the metallic cap 2. A backplate assembly 5 is mounted adjacent the diaphragm 4 and includes an electrode plate 6 which serves as a backplate and an insulating support 7 for holding the backplate 6 in the metal cap 2. The backplate 6 has a terminal pin 8 which extends through the insulating support 7 into the housing 3. An impedance converter 9 comprising a field effect transistor and a printed circuit board 10 is mounted within the housing 3 below the insulating member 7 as shown in FIG. 1. An insulated terminal board 12 is mounted in the end of housing 3 and external leads 15, 16 and 17 are connected to the terminal board. Leads 13 and 14 are connected from external leads 16 and 17 to the impedance converter 9 and lead 15 is connected to the housing 3 and in turn to the cap 2 and the diaphragm 4.

With conventional condenser microphones such as illustrated in FIG. 1, the size of the impedance converter 9 formed of hybrid circuits including printed circuits and components is relatively large and thus a small condenser microphone cannot be obtained. Also, the various leads in the microphone can become disconnected due to vibration or jar rendering the microphone inoperative.

The present invention provides a condenser microphone free from the drawbacks of the prior art which can be manufactured with an improved method.

Figure 2:
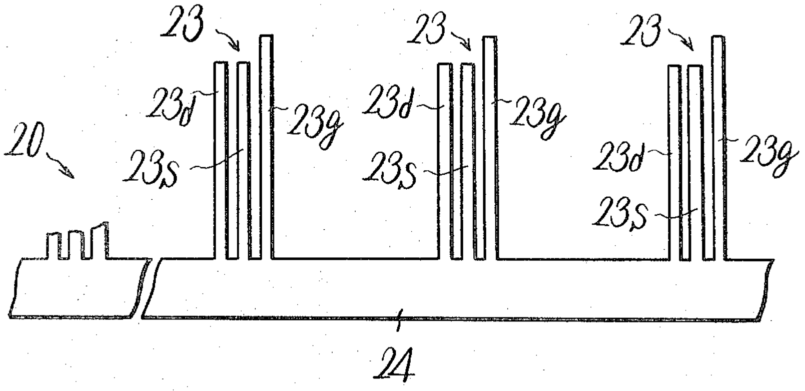
FIG. 2 is a plan view of a group of leads used in constructing condenser microphones of the invention.

FIG. 2 illustrates a thin conductive metal plate from which a plurality of groups of microphone electrodes are formed as, for example, by punching, etching or the like. The plate 20 has an enlarged transverse supporting portion 24 and a plurality of groups of electrodes or lead lines 23, and in each group there are a pair of electrodes 23*d* and 23*s*, respectively, of substantially the same length, and a third electrode 23*g* which is longer than the electrodes 23*d* and 23*s*.

Figure 3:
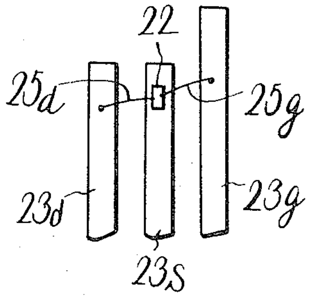
FIG. 3 is an enlarged plan view of one group of leads in which an integrated circuit pellet is attached to one of the leads at one end thereof.

FIG. 3 is an enlarged view of the ends of the electrodes 23*d*, 23*s* and 23*g* and illustrates a pellet or chip 22 comprising an integrated circuit element which might include an FET for use as an impedance converter. The pellet 22 is bonded to the upper end of the middle electrode 23*s* to mechanically support it and one of its input electrodes, as for example, its source electrode is connected to electrode 23*s*. The drain electrode of the FET is connected by lead 25*d* to the electrode 23*d* and the gate of the FET is connected by lead 25*g* to the electrode 23*g* as shown.

Figure 4:
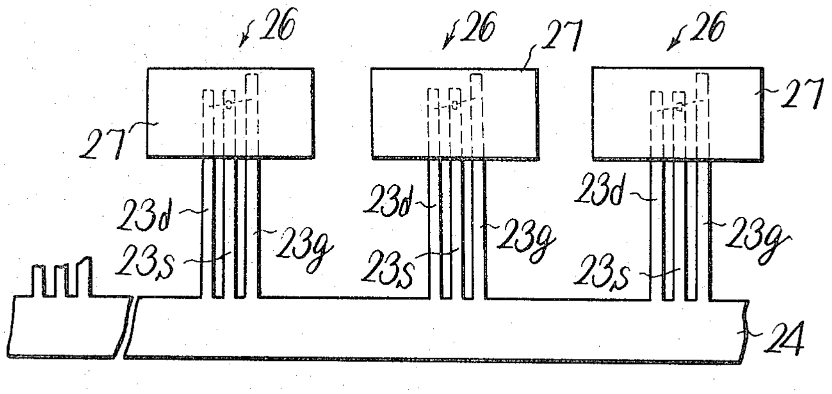
FIG. 4 is a plan view of the lead structure illustrated in FIG. 2 with integrated circuit pellets attached to each lead group and incapsulated.
Figures 5, 6, 7, 8:
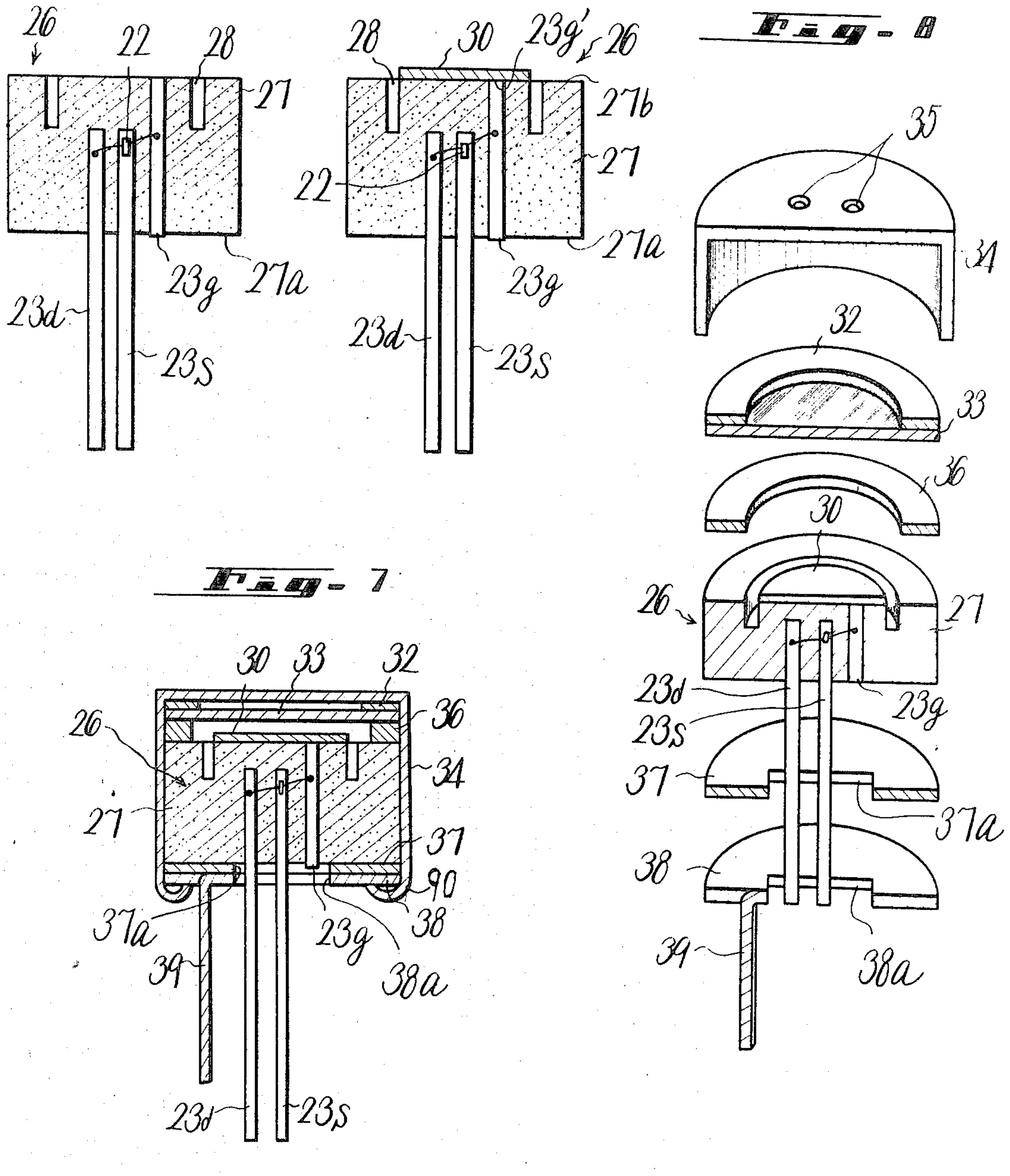
FIG. 5 is a vertical cross-sectional view taken through the incapsulated leads.
FIG. 6 is a vertical cross-sectional view of a backplate assembly formed by attaching a backplate to the upper surface of the structure of FIG. 5.
FIG. 7 is a vertical cross-sectional view of the completed condenser microphone of the invention.
FIG. 8 is a sectional exploded view of the condenser microphone of the invention.

After the FET and the input electrodes have been respectively connected to the electrodes 23*d*, 23*s* and 23*g*, the assembly is incapsulated in a disc-shaped mold with a suitable resin in a transfer molding method so as to embed the parts completely in resin as shown in FIG. 4. A wellknown epoxy resin, silicon resin or polyester resin may be employed for incapsulation. Thus, each of the field effect transistors is embedded with the ends of the electrodes in a molded support 27 which forms a part of a backplate assembly 26. The support 27 is disc-shaped and as best shown in sectional view, FIG. 5, is formed with an annular groove 28 which forms an acoustic chamber on the side opposite that from which electrodes 23*d* and 23*s* extend. It is to be realized, of course, that the groove 28 is formed at the same time that the ends of the electrodes 23*d*, 23*s* and 23*g* are incapsulated during the molding process. After the electrodes 23*s*, 23*g* and 23*d* have been incapsulated in the resin and the material has solidified, the leads 23*d* and 23*s* are cut free of the member 24 at the edge of member 24 and the lead 23*g* is cut flush with the back edge 27*a* of the support 27.

As shown, the upper end 23*g'* relative to the figures of electrode 23*g* extends above the upper ends of electrodes 23*d* and 23*s* and terminates at the upper surface of the support 27. The upper surface 27*b* of the support 27 is lapped and a backplate 30 of electrical conductive material is attached to the upper surface 27*b* within the confines of the annular acoustic chamber 28 as shown in FIG. 6. The backplate 30 might also be formed of metal by evaporating metal on the supper surface 27*b*, for example. The upper end 23*g'* of the electrode 23*g* is electrically connected to the backplate 30 as shown.

As shown in FIGS. 7 and 8, after the conductive backplate 30 is formed, an electrical diaphragm 33 which has an electrically conductive ring 32 on its upper edge portion is mounted into a cylindrical shaped metallic cup 34, such that it bears against the end of the cup. A spacer 36 of generally annular shape of insulating material is mounted adjacent the diaphragm 33 with the cup 34 and the backplate assembly 26 is inserted into the cup 34 against the ring 36 as shown. An insulating sheet 37 is mounted against the lower surface of the backplate assembly 26 and a shield plate 38 of electrically conductive material is mounted in the cup 34 against the insulating sheet 37. The lower end 90 of the cup 34 is rolled over to hold the assembly in place and form an integral microphone structure.

A terminal pin 39 is electrically connected to the shield plate 38 and is connected to the diaphragm 33 through the conducting cup 34 and conducting ring 32. The insulating sheet 37 and shield plate 38 are formed with central apertures 37a and 38*a*, respectively, through which the lead electrodes 23*d* and 23*s* extend. Openings 35 are formed in the end of the cup 34 to allow sound waves to enter the microphone and move the diaphragm 33.

FIG. 8 is an exploded view which illustrates the manner in which the microphone is assembled. It is to be realized that the support member 27 gives great rigidity and strength to the microphone and prevents the various leads of the FET from being broken by vibration or jar if the microphone is dropped, for example.

The number of parts in the condenser microphone of the present invention has been substantially reduced and the construction is greatly simplified over prior art structures. Thus, improved condenser microphones according to the invention may be easily manufactured at costs lower than those of the prior art.

Incapsulation of the FET leads and electrode also prevents them from being shorted together.

The embodiment illustrated in FIGS. 6, 7 and 8 utilize an electrical diaphragm but it is also possible to utilize an electret.

Figure 9:
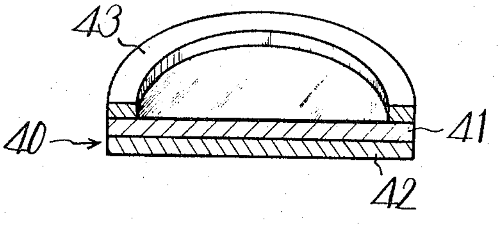
FIG. 9 is a cross-sectional perspective view of an electret used in the invention.

FIG. 9 illustrates such an embodiment wherein a diaphragm 40 consists of a metallic layer 41 and which has an electret 42 attached to one surface thereof and a conductive ring 43 attached to the other surface. The ring 43 is similar to ring 32 in the embodiment illustrated in FIGS. 7 and 8. Thus the diaphragm 40 illustrated in FIG. 9 may be utilized in place of the diaphragm 33 illustrated in FIGS. 7 and 8.

It is also possible to utilize an electret with a metallic plate instead of the backplate of FIGS. 6, 7 and 8.

Figure 10:
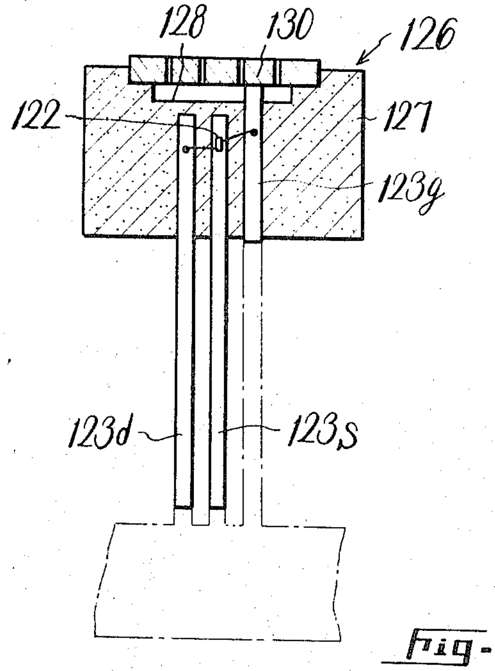
FIG. 10 is a vertical cross-sectional view of a modification of a backplate assembly of the invention.

FIG. 10 illustrates an embodiment wherein the backplate assembly 126 which has lead electrodes 123*g*, 123*s* and 123d, and an FET pellet 122 incapsulated and formed as in the embodiment illustrated in FIGS. 4–8. In this embodiment, however, the support 127 of the backplate assembly 126 is formed with a cavity 128 and a backplate 130 formed with holes is mounted above the cavity 128. The electrode 123*g* is attached to the lower surface of the backplate 130 as shown. The backplate 130 is made of electrically conductive material, for example. With this embodiment, the advantages of the embodiment of FIGS. 7 and 8 are obtained.

Figure 11:
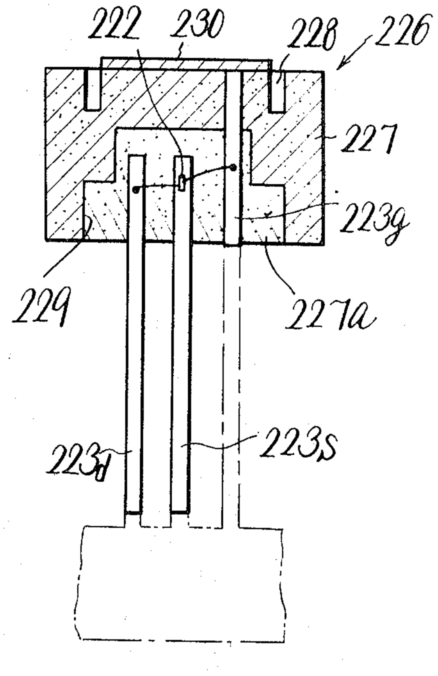
FIG. 11 is a vertical cross-sectional view of another modification of the backplate assembly of the invention.

FIG. 11 illustrates a further embodiment of the invention wherein the backplate assembly 227 is formed in two portions. The first portion 227 is generally cylindrical shaped and is made of insulating material, as for example ceramic or the like, and is formed with a sound cavity 228 in its upper surface and has an electrically conductive backplate 230 attached to the upper end thereof. Lead electrodes 223*d*, 223*s* and 223*g* are provided with a field effect transistor 222 connected to the source electrode 223*s* which has its source electrically connected to the electrode 223*s* and its drain connected by a lead to electrode 223*d* and its gate connected by a lead to electrode 223*g*. The assembly is then incapsulated in a cavity 229 formed in the ceramic support 227 with the end of electrode 223*g* extending through an opening in the ceramic support 227. The electrode 223*g* is connected to the backplate 230 as shown. The resin is designated as 227*a*.

Thus, in the other embodiments, as in the embodiment of FIG. 11, only a portion of the support need be incapsulated by molding to form the improved backplate assembly.

Figure 12:
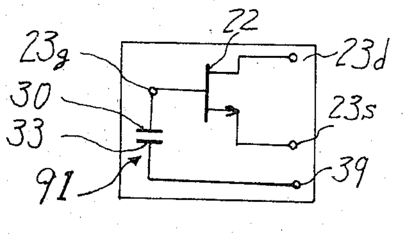
FIG. 12 is an electrical schematic showing the electrical connections in the invention.

FIG. 12 is an electrical schematic illustrating the field effect transistor 22. The electrode 23*g* is connected to the backplate 30 of the microphone 91 and the electrode 33 is connected through the housing to external supply lead FET 22 The source and drain of the field effect transistor FET22 are respectively connected to electrodes 23*s* and 23*d*.

It is seen that this invention provides an improved condenser microphone and method, and although it has been described with respect to preferred embodiments, it is not to be so limited as changes and modifications may be made which are within the full intended scope as defined by the appended claims.

What we claim is:

1. A condenser microphone comprising:
an electrical diaphragm means;
a backplate assembly consisting of a backplate and plastic insulating means for supporting said backplate adjacent said diaphragm means and having at least one acoustic chamber;
at least three electrical conducting leads molded in said insulating means and separated from each other, one of said leads connected to said backplate and the other leads extending out of said insulating means, and
an integrated circuit pellet mounted on one of said leads and molded in said insulating means, said integrated circuit pellet having electrode connecting means connected to the other leads.

2. A condenser microphone as claimed in claim 1, in which there are at least three electrical conducting leads and said integrated circuit pellet is a field effect transistor which is attached to the central one of said three leads and the gate of said field effect transistor is connected to said one lead which is connected to said backplate.

3. A condenser microphone comprising:
a metallic cap;
electrical diaphragm means disposed in and connected to said cap;
backplate means disposed in said cap and spaced a predetermined distance from said diaphragm means;
insulating means for supporting said backplate means from said cap and at least one acoustic chamber provided in said insulating means;
a plurality of leads separately molded in said insulating means with one of said leads directly connected to said backplate means and the other of said leads extending out from said insulating means;
solid state electrode active means bonded to one of said leads and molded in said insulating means and having a plurality of electrode conductors to be connected to the other leads; and
a conductor means mounted on said cap and electrically connected to said diaphragm through said cap.

4. A condenser microphone as claimed in claim 3, in which there are at least three leads and said solid state electronic active means comprises a field effect transistor FET which is attached to the center one of said three leads and with its gate connected to said one lead which is connected to said backplate.

5. A condenser microphone comprising:
an electrical diaphragm;
a backplate opposing said diaphragm and spaced apart therefrom a predetermined distance;
insulating means supporting said backplate and having an acoustic chamber formed therein;
first and second leads having one end portions molded in said insulating means and their other end portions extending from said insulating means;
a third lead molded in said insulating means and connected to said backplate; and
an electronic active element mounted on one of said leads and molded in said insulating means and said electronic active element having at least two electrode conductors connected to said other two leads.

6. A condenser microphone as claimed in claim 5, in which said insulating means has a recess formed on the side opposite said backplate and said electronic active element and leads molded with resin in said recess.

7. A condenser microphone according to claim 1, wherein said backplate is formed with openings and a sound chamber is formed between said backplate and said plastic insulating means.

8. A condenser microphone according to claim 1, wherein said backplate includes an electret.

9. A method of making a condenser microphone comprising the steps of:
forming a plurality of electrical leads;
attaching an integrated circuit pellet on one of said plurality of leads;
connecting electrodes of said integrated circuit pellet to the other leads;
molding said plurality of leads including said integrated circuit pellet in insulating material;
mounting a backplate on said molded insulating material; and
mounting an electrical diaphragm adjacent said backplate with a predetermined distance therebetween.

10. A method of making a condenser microphone as claimed in claim 9, lapping one surface of said molded insulating material so as to expose one of said leads.

11. A method of making a condenser microphone as claimed in claim 10, in which said backplate is vaporized onto said lapped surface.

12. A method of making a condenser microphone comprising the steps of:

providing a plurality of lead groups, each lead group consisting of at least three leads, and one ends of the leads of said lead groups being attached to a common frame;

bonding an integrated circuit pellet to one of said leads of each of said lead groups;

connecting electrodes of said integrated pellet to the other leads of each of said lead groups;

molding carts of said leads and said integrated circuit pellets in resin to form a molded body;

cutting off said leads of said lead groups from said common frame so they are of a predetermined length;

forming a backplate on one surface of said molded body; and forming an electrical diaphragm and mounting it a predetermined distance from said backplate.

* * * * *